(12) United States Patent
Hintermeister et al.

(10) Patent No.: US 7,870,193 B2
(45) Date of Patent: Jan. 11, 2011

(54) COLLABORATIVE, EVENT DRIVEN SYSTEM MANAGEMENT

(75) Inventors: Gregory Richard Hintermeister, Rochester, MN (US); Frank Lawrence Jania, Chapel Hill, NC (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 11/467,635

(22) Filed: Aug. 28, 2006

(65) Prior Publication Data

US 2008/0126480 A1 May 29, 2008

(51) Int. Cl.
*G06F 15/16* (2006.01)
(52) U.S. Cl. .................. 709/204; 713/200; 715/511; 715/733; 715/748
(58) Field of Classification Search .................. 709/204
See application file for complete search history.

(56) References Cited

U.S. PATENT DOCUMENTS

| 6,606,644 | B1 | 8/2003 | Ford et al. | |
|---|---|---|---|---|
| 2002/0157017 | A1* | 10/2002 | Mi et al. | 713/200 |
| 2003/0110228 | A1 | 6/2003 | Xu et al. | |
| 2004/0117407 | A1 | 6/2004 | Kumar et al. | |
| 2004/0220893 | A1 | 11/2004 | Spivack et al. | |
| 2005/0228895 | A1 | 10/2005 | Karunamurthy et al. | |
| 2006/0010197 | A1* | 1/2006 | Ovenden | 709/204 |
| 2006/0026502 | A1* | 2/2006 | Dutta | 715/511 |
| 2006/0123347 | A1* | 6/2006 | Hewitt et al. | 715/748 |
| 2006/0242581 | A1* | 10/2006 | Manion et al. | 715/733 |
| 2006/0288286 | A1* | 12/2006 | Chandler et al. | 715/716 |
| 2007/0005695 | A1* | 1/2007 | Chen et al. | 709/204 |

FOREIGN PATENT DOCUMENTS

| WO | WO 02/37392 A2 | 5/2002 |
|---|---|---|
| WO | WO 02/101483 A2 | 12/2002 |

OTHER PUBLICATIONS

"Linking Instant Messaging to Publish/Subcribe Messaging", Research Disclosure 438166, IBM Corporation, Oct. 2000, p. 1875.

* cited by examiner

*Primary Examiner*—Vivek Srivastava
*Assistant Examiner*—Vivek Krishnan
(74) *Attorney, Agent, or Firm*—Stephen R. Tkacs; Stephen J. Walder, Jr.; Feb R. Cabrasawan (57) ABSTRACT

A collaboration system is provided in combination with a system administration monitoring system. The monitoring software for the system may recognize an error or other event in a component that is being monitored. The monitoring software then sends a message to all administrators that may be associated with the error or event. When an administrator receives an alert, the administrator may choose to join a collaborative resolution session. When a plurality of administrators joins a collaborative resolution session, each administrator is presented with a user interface at his or her console. The user interface may present one or more shared system administration elements, such as system administration portals, and one or more collaboration elements, such as instant messaging elements or the like. Participating administrators may then communicate using the collaboration elements to attempt to resolve an error or other event. Users may share additional system administration elements.

26 Claims, 8 Drawing Sheets

COLLABORATIVE, EVENT DRIVEN SYSTEM MANAGEMENT

BACKGROUND

1. Technical Field

The present application relates generally to an improved system management data processing system and method. More specifically, the present application is directed to computer program product, system, and method for collaborative, event driven system management.

2. Description of Related Art

An administrator is a person who manages the computer systems in an organization. A system administrator is involved with OS and hardware installations and configurations and may be involved with application installations and upgrades. A network administrator is a person who manages a local area network (LAN) within an organization. Responsibilities include network security, installing new applications, distributing software upgrades, monitoring daily activity, enforcing licensing agreements, developing a storage management program and providing for routine backups. A database administrator is responsible for the physical design and management of a database and for the evaluation, selection, and implementation of a database management system.

The responsibilities of a system administrator and network administrator often overlap; however, the system administrator is generally more geared to the computer hardware and less on the network. In some cases, however, system and network administrator are one in the same, especially in smaller companies. However, a larger company may have many administrators to manage the various aspects of the company's computer systems.

A monitoring system monitors various components of the computer system for errors and sends alerts or messages to a console of the administrator. The administrator may respond to the alerts and take steps to correct the errors. With a plurality of administrators in a company, an alert may be directed to the wrong administrator. Alternatively, an error may require action by a plurality of administrators.

SUMMARY

In one illustrative embodiment, a computer program product comprises a computer recordable medium having a computer readable program recorded thereon. The computer readable program, when executed on a computing device, causes the computing device to monitor a computer system. The computer system comprises a plurality of computer system components. The computer readable program further causes the computing device to initiate a collaborative session with a plurality of participants responsive to a system administration monitoring system, detecting an error in a given computer system component within the plurality of computer system components. The computer readable program further causes the computing device to examine a collaboration session history responsive to the system administration monitoring system detecting the error in the given computer system component in the system administration monitoring system, identify a default collaboration user interface configuration based on past collaboration sessions in the collaboration session history and the error in the given computer system component, and provide at least one shared system administration user interface component to a collaboration user interface in a client device associated with each of the plurality of participants. The collaboration user interface is presented at each client device according to the default collaboration user interface configuration.

In another illustrative embodiment, an apparatus is provided that comprises a processor and a memory coupled to the processor. The memory contains instructions which, when executed by the processor, cause the processor to monitor a computer system. The computer system comprises a plurality of computer system components. The instructions further cause the processor to initiate a collaborative session with a plurality of participants responsive to a system administration monitoring system detecting an error in a given computer system component within the plurality of computer system components. The instructions further cause the processor to examine a collaboration session history responsive to the system administration monitoring system detecting the error in the given computer system component in the system administration monitoring system, identify a default collaboration user interface configuration based on past collaboration sessions in the collaboration session history and the error in the given computer system component, and provide at least one shared system administration user interface component to a collaboration user interface in a client device associated with each of the plurality of participants. The collaboration user interface is presented at each client device according to the default collaboration user interface configuration.

In other exemplary embodiments, the memory may contain instructions which, when executed by the processor, cause the processor to perform one or more of the operations described above with regard to the computer readable program.

In a still further illustrative embodiment, a method is provided in a data processing system for collaborative system management. The method comprises monitoring a computer system. The computer system comprises a plurality of computer system components. The method further comprises initiating, by the data processing system, a collaborative session with a plurality of participants responsive to a system administration monitoring system detecting an error in a given computer system component within the plurality of computer system components. The method may further comprise examining a collaboration session history responsive to the system administration monitoring system detecting the error in the given computer system component in the system administration monitoring system, identifying, by the data processing system, a default collaboration user interface configuration based on past collaboration sessions in the collaboration session history and the error in the given computer system component, and providing at least one shared system administration user interface component to a collaboration user interface in a client device associated with each of the plurality of participants. The collaboration user interface is presented at each client device according to the default collaboration user interface configuration.

In further exemplary embodiments, the method may comprise one or more of the operations described above with regard to the computer readable program.

In a further illustrative embodiment, a method is provided for providing collaborative system management service. The method comprises providing a collaboration system for a data processing system and configuring the collaboration system to receive events from a system administration monitoring system. The system administration monitoring system monitors a computer system comprising a plurality of computer system components. The method further comprises configuring the collaboration system to initiate a collaborative session with a plurality of participants responsive to a system administration monitoring system detecting an error in a given computer system component within the plurality of computer system components examine a collaboration session history responsive to the system administration monitoring system detecting the error in the given computer system component in the system administration monitoring system, and identify a default collaboration user interface configuration based on past collaboration sessions in the collaboration session history and the error in the given computer system component. The method further comprises configuring the collaboration system to provide at least one shared system administration user interface component to a collaboration user interface in a client device associated with each of the plurality of participants. The collaboration user interface is presented at each client device according to the default collaboration user interface configuration.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
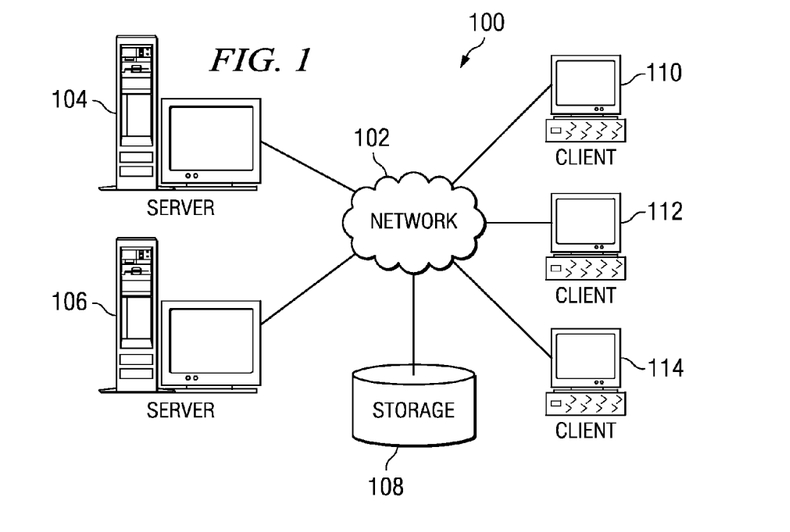
FIG. 1 depicts a pictorial representation of an exemplary distributed data processing system in which aspects of the illustrative embodiments may be implemented.
Figure 2:
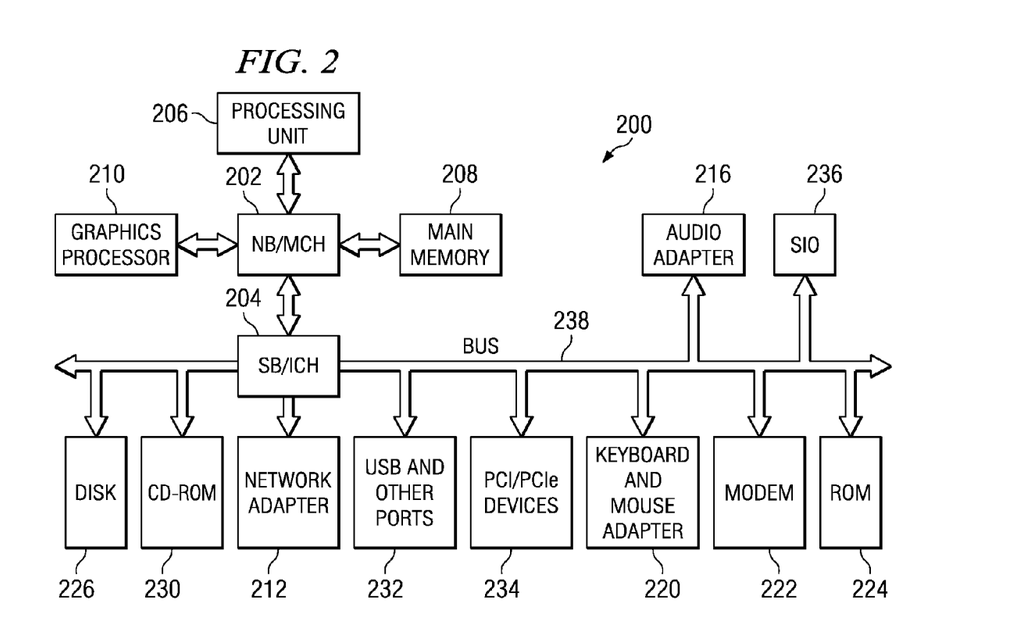
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

More particularly, server 104 may host a system administration monitoring system. Server 104 may monitor for events received from components within distributed data processing system 100. That is, components, such as servers, applications, routers, databases, storage devices, clients, and the like, may run monitoring applications that report events to a system administration monitoring system on server 104. When certain events occur, the system administration monitoring system may send alerts to administration consoles within distributed data processing system 100.

One or more of clients 110, 112, 114 may be administration consoles with componentized system administration elements to view alerts and status information for the components in distributed data processing system 100. The system administration elements may be portals, for example. An administrator may receive an alert at client 110, for instance, and bring up a user interface that shows a storage health portlet with information about the status of storage resources within distributed data processing system 100.

A portlet is a small window on a portal page. Portlet technology allows a portal page to be customized more quickly either internally by the development team or by the end user. In a system administration console user interface, a portal may provide, for example, storage health information, database health information, a terminal emulator, or other component status or error information.

As stated above, with a plurality of administrators in a company, an alert may be directed to the wrong administrator. Also, an error may require action by a plurality of administrators. In accordance with one illustrative embodiment, a collaboration system is provided in combination with the system administration monitoring system. The monitoring software for the system may recognize an error or other event in a component that is being monitored. The monitoring software then sends a message to all administrators that may be associated with the error or event. When an administrator receives an alert, the administrator may choose to join a collaborative resolution session.

When a plurality of administrators joins a collaborative resolution session, each administrator is presented with a user interface at his or her console. The user interface may present one or more shared system administration elements, such as system administration portals, and one or more collaboration elements, such as instant messaging elements or the like. Participating administrators may then communicate using the collaboration elements to attempt to resolve an error or other event. Users may share additional system administration elements.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
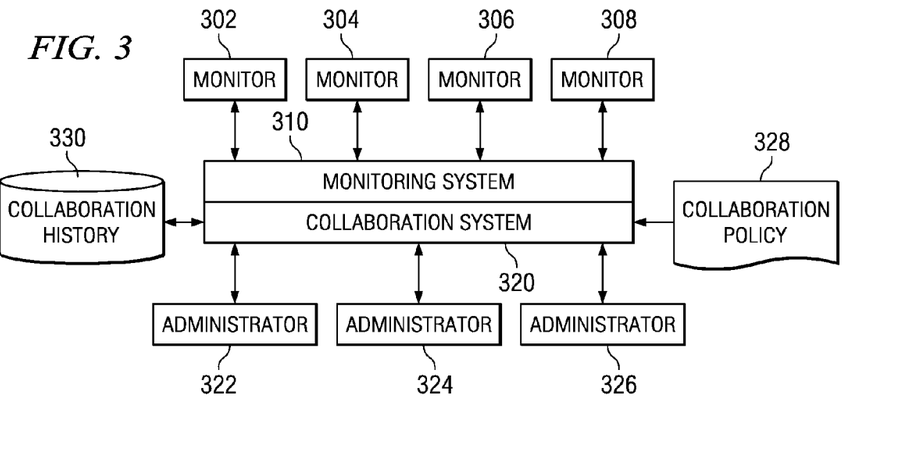
FIG. 3 is a block diagram illustrating a system administration collaboration system in accordance with an illustrative embodiment.

FIG. 3 is a block diagram illustrating a system administration collaboration system in accordance with an illustrative embodiment. Monitors 302-308 monitor various components of a computer system for errors or other events. Monitors 302-308 may be software monitors, such as software agents, for example.

Monitoring system 310 receives events from monitors 302-308. Responsive to particular errors or events, collaboration system 320 sends messages to one or more of administrator clients 322-326 inviting the administrators to join a collaboration session. Administrator clients 322-326 may be administrator consoles, laptop computers, mobile devices, and the like.

Collaboration system 320 may send a broadcast message to administrator clients 322-326; however, other techniques may be used to contact people who may participate in the collaboration session. For example, collaboration system 320 may send electronic mail messages, instant messages, voice messages, and the like. In one exemplary embodiment, collaboration system 320 may consult a profile (not shown) associated with a given participant to determine the messaging system to use to invite the participant to the collaboration session. Alternatively, this information may be stored in collaboration policy 328.

Collaboration system 320 manages the collaboration session. Using collaboration client software at administrator clients 322-326, administrators may send chat messages and other collaboration messages to collaboration system 320, which in turn broadcasts the messages to the other participating administrators. Using the collaboration client software, an administrator may share administrator console user interface components with other participants through collaboration system 320.

When starting a collaboration session, collaboration system 320 determines parameters for the session based on the event received from the monitors and collaboration policy 328. The parameters for a collaboration session may include, for example, a group of administrators to invite, one or more default administrator console user interface components, a default collaboration session moderator, and the like.

Collaboration system 320 may store collaboration log information in collaboration history storage 330. Old collaborations may be referenced from collaboration history 330 and "played back" using collaboration client software to see what happened. Past collaboration window views may be used to build custom views, which may be referenced in collaboration policy 328. When monitoring system 310 discovers a new problem, collaboration system 320 may sift through old collaboration sessions to see if an optimized group of participants may be contacted with optimized portlet views.

If a history of collaboration sessions is not found for a particular error or event in collaboration history storage 330, collaboration system 320 may determine the group of participants to invite to the collaboration session using other techniques. For example, collaboration system 320 may simply invite anyone with administrative access. However, in an alternative embodiment, collaboration system may examine user profiles to identify people in a particular area of expertise, with certain access control, and so forth. Collaboration system 320 may also use these techniques in conjunction with information found in collaboration history storage 330.

Figure 4A:
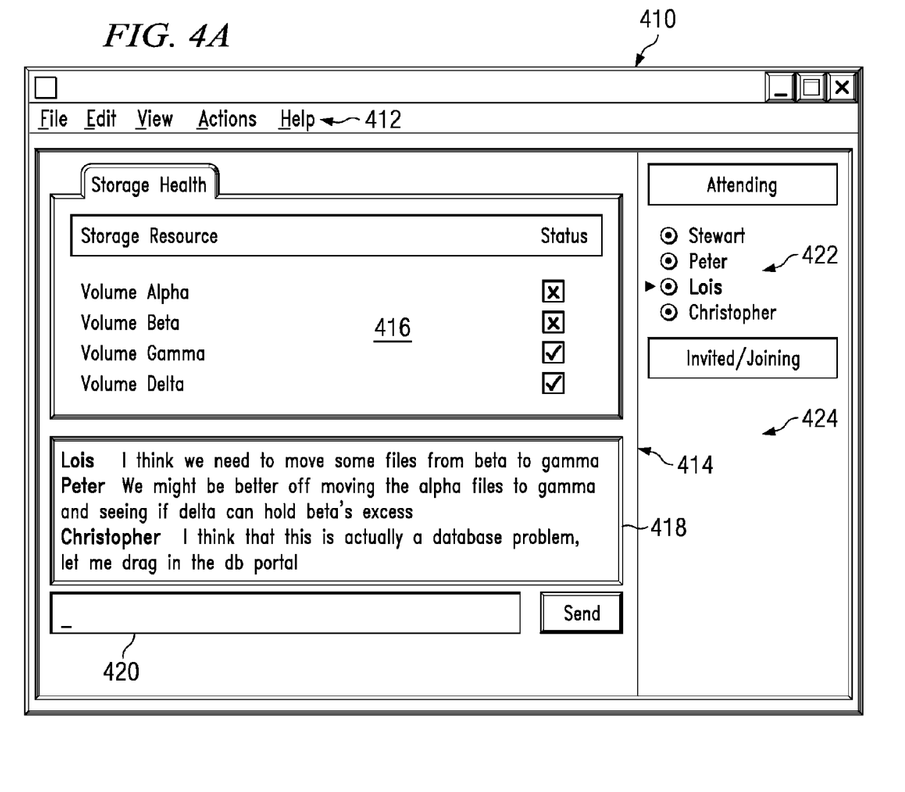
FIGS. 4A-4F are example screens of display for a system administration collaboration session user interface in accordance with illustrative embodiments.

FIGS. 4A-4G are example screens of display for a system administration collaboration session user interface in accordance with illustrative embodiments. More particularly, FIG. 4A depicts system administration collaboration session user interface 410 for a collaboration session. Collaboration window 410 comprises menu bar 412 and display area 414.

Display area 414 includes shared system administration user interface component 416, text chat display component 418, text chat input component 420, attending participant list component 422, and invited/joining participant list component 424. In the depicted example shown in FIG. 4A, shared system administration user interface component 416 is a storage health portlet from a system administrator console user interface. Other shared administration user interface components may be included in display area 414, as will be discussed in further detail below.

As illustrated in FIG. 4A, shared system administration user interface component 416 presents the health of various storage resources, namely volume Alpha, volume Beta, volume Gamma, and volume Delta. All attending participants are presented with shared component 416. Thus, participants Stewart, Peter, Lois, and Christopher see that volume Gamma and volume Delta are operational, while volume Alpha and volume Beta are not operational.

Text chat display component 418 and text chat input component 420 allow participating administrators to express ideas about the problem at hand, in this example the health of volume Alpha and volume Beta. Attending list component 422 and invited/joining list component 424 allow attending administrators to see who is participating in the collaboration session or who is invited to join. A person of ordinary skill in the art will recognize that any known or future collaboration tools may be included within system administration collaboration session user interface 410 without departing from the spirit and scope of the illustrative embodiments. For example, collaboration window 410 may include voice chat, whiteboard, user icons, and the like. Collaboration window 410 may also include other user interface components that are not shown, such as right-click menus, scroll bars, tool bar buttons, and so forth.

Figure 4B:
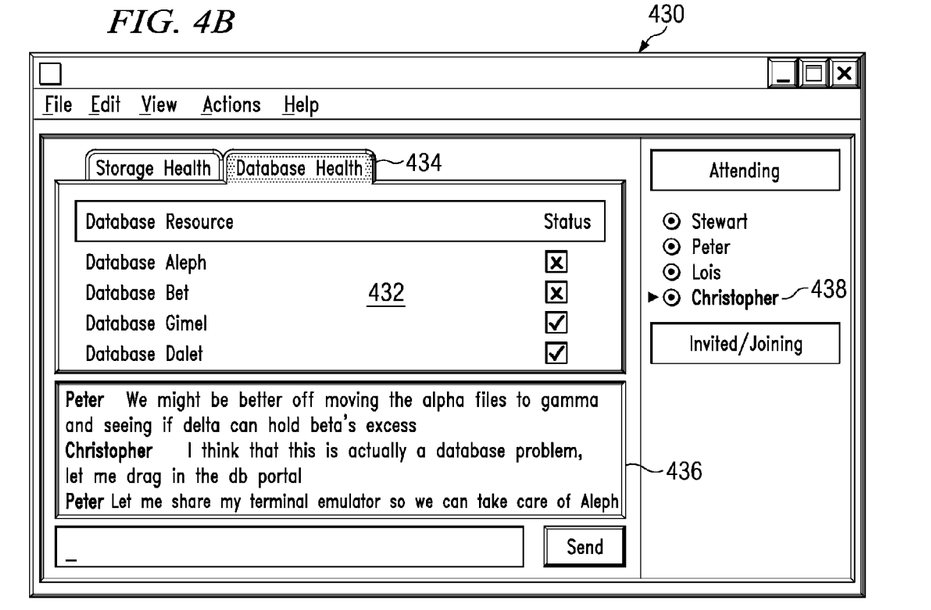

As seen in the depicted example, Lois is designated as the administrator using a graphical indicator and bold face type. In text chat display component 418, Christopher volunteers to share a database health user interface component. Turning to FIG. 4B, as seen in system administration collaboration session user interface 430, Christopher becomes the moderator of the collaborative session, as shown at 438. Christopher shares database health user interface component 432. In the depicted example, the shared user interface components are presented in a tabbed pane. The user may select a shared user interface component by selecting a tab, such as tab 434 for database health component 434.

Shared system administration user interface component 432 presents the health of various database resources, namely database Aleph, database Bet, database Gimel, and database Dalet. In this instance, database Gimel and database Dalet are operational. Database Aleph and database Bet are not operational.

Figure 4C:
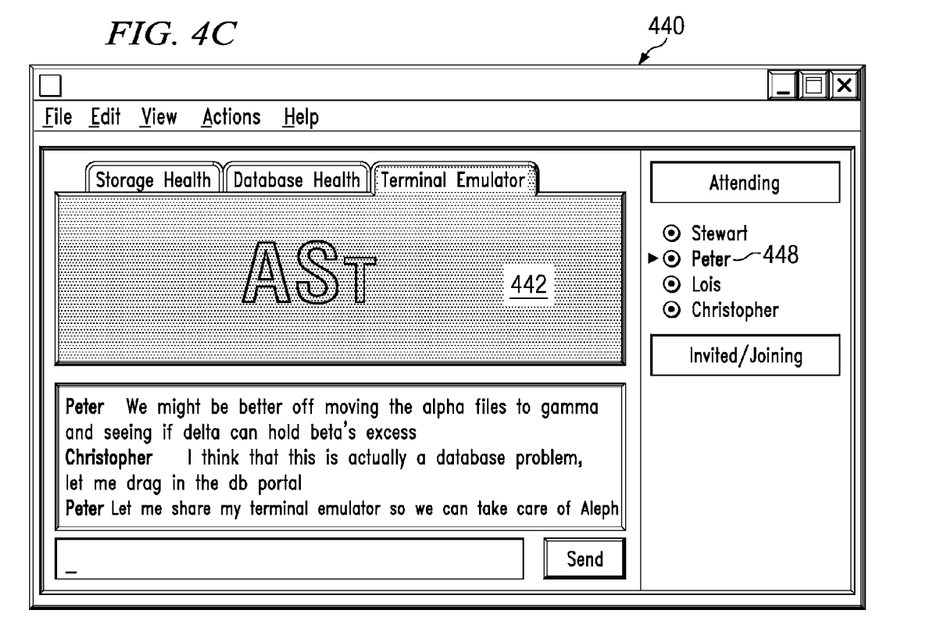

As shown in text chat display component 436, Peter volunteers to share a terminal emulator screen. With reference now to FIG. 4C, as seen in system administration collaboration session user interface 440, Peter becomes the moderator of the collaborative session, as shown at 448. Peter shares terminal emulator user interface component 442.

The collaboration window allows user interface components, such as administrator console portlets, to be added dynamically from multiple participants. In addition, where portlets are not available, enhancements may be made to the sharing technology to allow a user to select a portion of the screen with a pointing device, such as a mouse, simply by drawing a rectangle around the view to share. The sharing party's collaboration software keeps track of the selected portion and shares it in the collaboration window. The collaboration software may also track the relative coordinates of the shared area to allow the user to move the original window around and even put the original window in the background while still maintaining that the shared portion is visible to the other participants.

In this case, Peter may share this component by selecting an area of his screen and building a shared user interface component, such as a portlet, that presents the selected area of Peter's screen to the other collaboration participants. Therefore, a shared user interface component may be a portlet, a whole window, or even a selected portion of a screen within relative coordinates within the screen real estate.

Figure 4D:
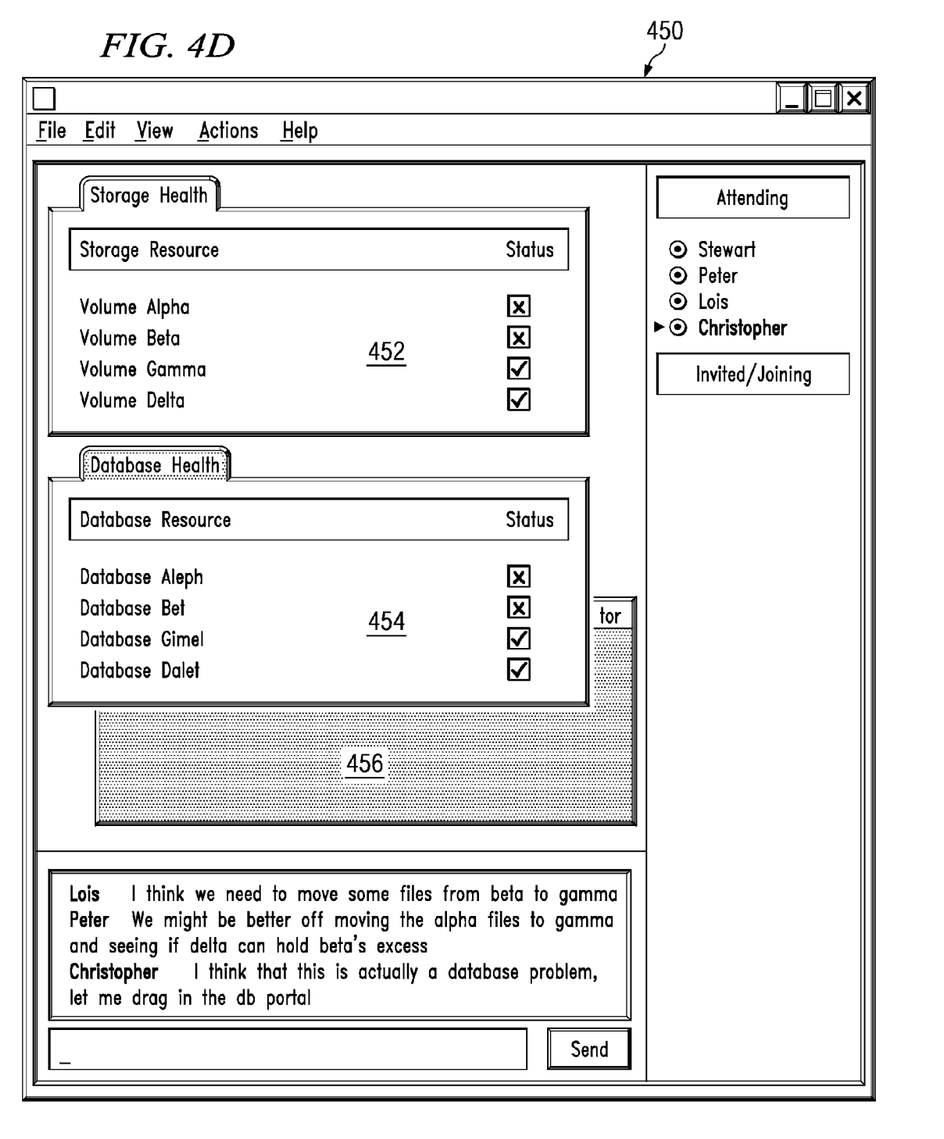

FIG. 4D depicts system administration collaboration session user interface 450 for a collaboration session where the shared user interface components are undocked. The user may arrange storage health user interface component 452, database health user interface component 454, and terminal emulator user interface component 456 in any desired manner.

A collaboration session may be made up of administrators and system operators. Operators may not have access to the same resources as administrators. Therefore, when an administrator shares a portlet or other user interface component, a system operator may not be permitted to view a shared user interface component that the administrators are permitted to view.

Figure 4E:
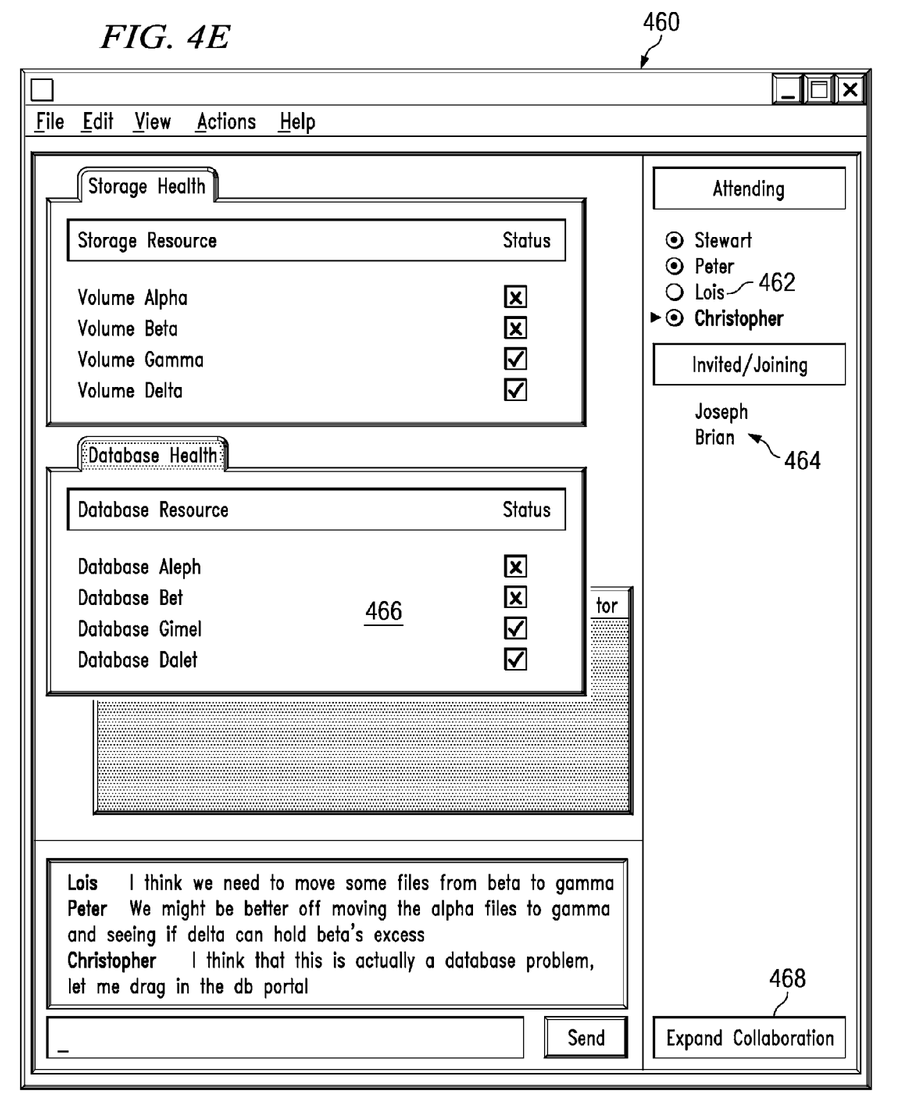

Thus, with reference to FIG. 4E, in system administration collaboration session user interface 460, the user may select particular participants from which to hide the shared user interface component. In this instance, Christopher, who is sharing database health user interface component 466, deselects a checkbox or radio button for Lois, as shown at 462. The blocked participant will not be permitted to view the shared user interface component in his or her collaboration window. The selectable controls, such as radio button 462, for instance, represent permission for the collaboration session participants. These permissions may be associated with individual shared user interface components or with all shared components for a particular participant.

In addition, current participants may invite further participants to join the collaboration session. Here, an administrator, such as the moderator, Christopher, invites Joseph and Brian to the collaboration session, as seen at 464. When the invited administrators finish joining the collaboration session, they appear in the attending participant list component.

In some cases, it may not be possible to isolate the core problem when an initial symptom is discovered. For example, one may not immediately realize that an online store front is slow because back-end storage is failing. Therefore, as the initial set of administrators is working on a problem, the administrators may open user interface components associated with various related resources. One administrator may select "Expand Collaboration" button 468, which activates an expand collaboration function of the collaboration software.

The expand collaboration function may exist within the collaboration system or the collaboration client software. The expand collaboration function may expand the collaboration to other participants, such as experts in the related areas or resources.

Figure 4F:
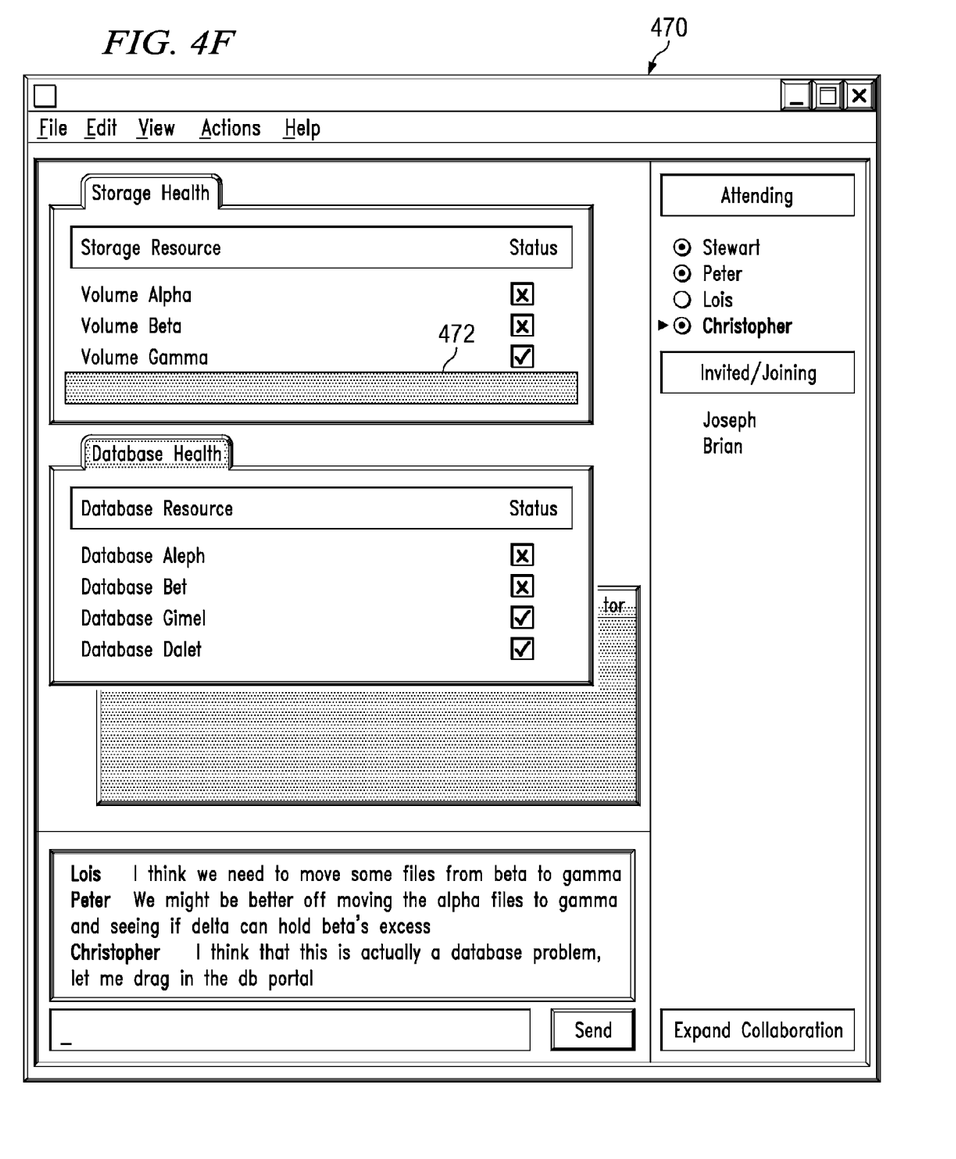

A collaboration session participant may hide sensitive areas by "erasing" or "masking" specific portions of the shared component or shared screen area. The participant sharing the user interface component may select a mask tool from a toolbar or menu, for example, and select an area to mask or hide. Turning now to FIG. 4F, system administration collaboration window 470 illustrates masked area 472. Here, the information for volume Delta is masked by the sharing participant. All other participants in the collaboration session cannot see what is behind masked area 472.

Figure 4G:
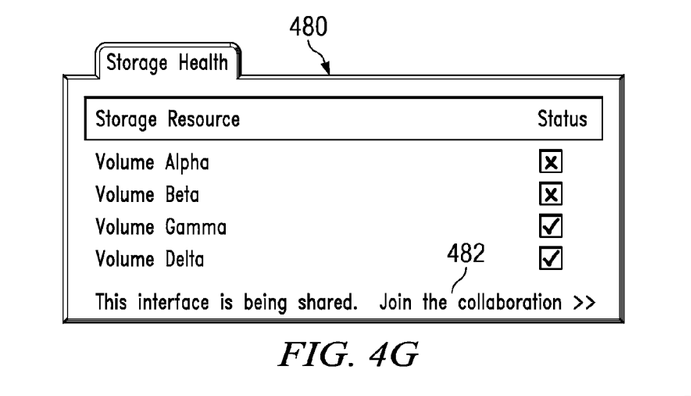
FIG. 4G is an example screen of display for a system administration user interface component in accordance with an exemplary embodiment.

FIG. 4G is an example screen of display for a system administration user interface component in accordance with an exemplary embodiment. If an administrator not in the collaborative session opens a user interface component, that user may see that the user interface component is part of a collaborative session. In FIG. 4G, user interface component 480 includes selectable control 474, which notifies a user that the user interface component is being shared. The user may select control 474 to join the collaborative session.

FIGS. 4A-4G are intended as examples to illustrate exemplary aspects of the illustrative embodiments. The actual user interface layouts, including the specific components and controls used, are not meant to limit the present invention. It will be appreciated by those skilled in the art that the chat component may be replaced or augmented by voice or audio communication. The non-moderator participants may use a portlet area as a whiteboard, optionally at the discretion of the moderator. The heuristic that determines the moderator may be extended beyond "first-come, first-served" to one that is more intelligent and based upon available profile or error information. Other modifications to the depicted examples may be made within the spirit and scope of the illustrative embodiments.

Figure 5:
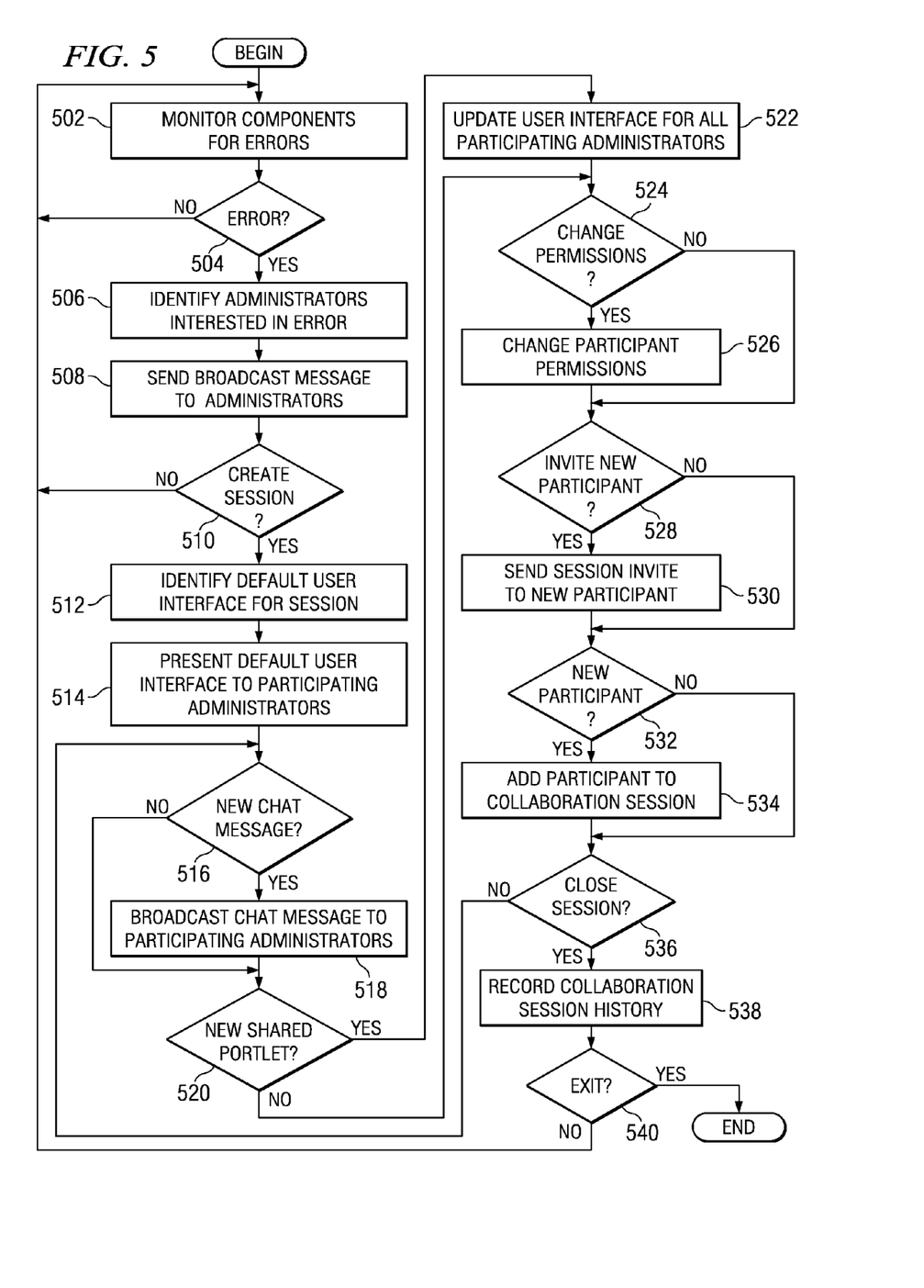
FIG. 5 is a flowchart illustrating the operation of a system administration collaboration system in accordance with an illustrative embodiment.

FIG. 5 is a flowchart illustrating the operation of a system administration collaboration system in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 5, operation begins and a monitoring system monitors system components for errors (block 502). The monitoring system determines whether an error is detected (block 504). If an error is not detected, operation returns to block 502 to continue monitoring system components.

If an error is detected in block 504, a collaboration system identifies administrators that may be interested in or associated with the detected error (block 506). The collaboration system sends a broadcast message to invite the identified administrators to a collaboration session (block 508).

The collaboration system determines whether to create a collaboration session (block 510). This determination may be made, for example, when a first administrator responds to the invitation, when an administrator designated as the moderator responds to the invitation, or when a predetermined number of administrators respond to the invitation. If the collaboration system determines that a collaboration session is not to be created, operation returns to block 502 to continue monitoring system components for errors.

If the collaboration system determines that a collaboration session is to be created in block 510, the collaboration system identifies a default user interface for the session (block 512). The collaboration system may identify a default user interface, for example, by using a template, by examining a collaboration policy file, by sifting through previous collaboration sessions having the same or a similar error and group of participants, etc. Next, the collaboration system presents the default user interface to the participating administrators through the participants' collaboration client software (block 514).

The collaboration system determines whether a new chat message is received from a participant (block 516). If a new chat message is received, the collaboration system broadcasts the chat message to the participating administrators (block 518).

Thereafter, or if a new chat message is not received in block 516, the collaboration system determines whether a new portlet or other user interface component is being shared by a participant (block 520). If a new portlet is being shared, the collaboration system updates the user interface for all participating administrators (block 522).

Thereafter, or if a new user interface component is not being shared in block 520, the collaboration system determines whether a participant changes permissions for other participants for a shared user interface component (block 524). If a participant changes permissions, the collaboration system persists the changes to the collaboration client software of the affected participants (block 526).

Thereafter, or if a participant does not change permissions in block 524, the collaboration system determines whether to invite a new participant to the collaboration session (block 528). This determination may be made, for example, by determining whether a participant expressly invites a new participant or whether an expand collaboration function is invoked, in which case, the new participant may be determined based on the set of related resources being shared within the collaboration session, and possibly previous collaboration sessions. If the collaboration system determines to invite one or more new participants, the collaboration system sends session invites to the new participants (block 530).

Thereafter, or if a new participant is not to be invited in block 528, the collaboration system determines whether a new participant has joined the collaboration session (block 532). If a new participant has joined the session, the collaboration system adds the participant to the collaboration session (block 534).

Thereafter, or if a new participant is not added to the collaboration session in block 532, the collaboration system determines whether to close the collaboration session (block 536). This determination may be made, for example, by determining whether all participants have left the session or whether the moderator has closed the session. If the collaboration system determines not to close the session, operation returns to block 516 to determine whether a new chat message is received.

If the collaboration system determines to close the collaboration session in block 536, the collaboration system records the collaboration session in a history storage or log (block 538). Then, the collaboration system determines whether an exit condition exists. An exit condition may exist, for example, if the collaboration system shuts down. If an exit condition does not exist, operation returns to block 502 to continue monitoring system components for errors. If an exit condition exists in block 540, operation ends.

Figure 6:
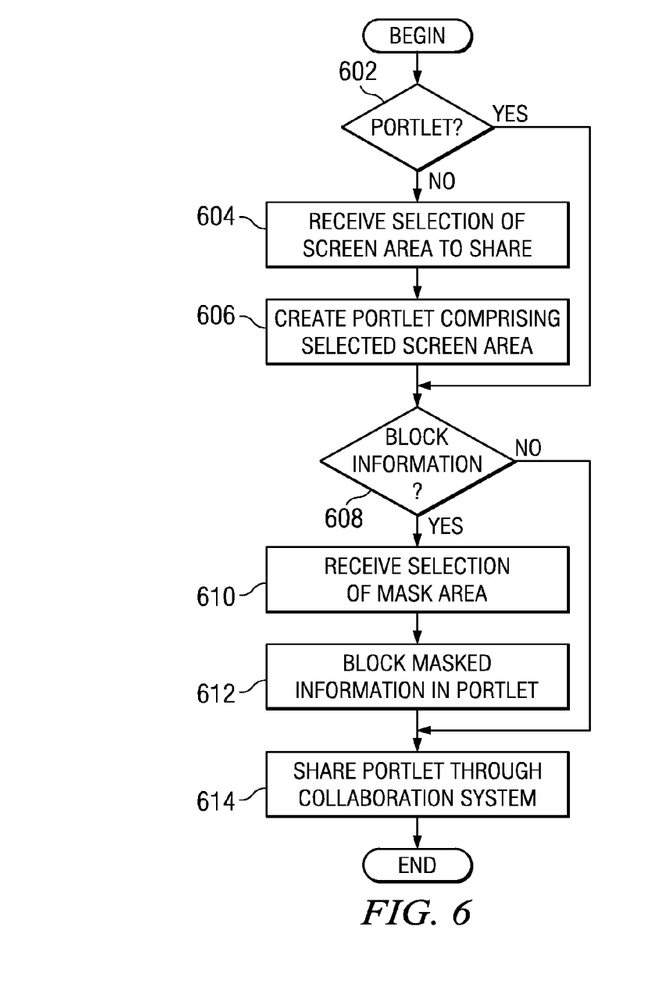
FIG. 6 is a flowchart illustrating operation of collaboration client software sharing a user interface component in accordance with an illustrative embodiment.

FIG. 6 is a flowchart illustrating operation of collaboration client software sharing a user interface component in accordance with an illustrative embodiment. Operation begins and the collaboration client software determines whether the shared user interface component is a portlet (block 602). If the component is a not portlet, the collaboration client software receives a selection of screen area to share (block 604). Then, the collaboration client software creates a portlet comprising the selected screen area (block 606).

Thereafter, or if the user interface component is a portlet in block 602, the collaboration client software determines whether the sharing participant wishes to block information in the portlet (block 608). If the participant wishes to block information, the collaboration client software receives a selection of a mask area (block 610) and blocks the masked information in the portlet (block 612).

Thereafter, or if the user does not wish to block information in block 608, the collaboration client software shares the portlet through the collaboration system (block 614). Then, operation ends.

Thus, the illustrative embodiments solve the disadvantages of the prior art by providing a collaboration system in combination with a system administration monitoring system. The monitoring software for the system may recognize an error or other event in a component that is being monitored. The monitoring software then sends a broadcast message to all administrators that may be associated with the error or event. When an administrator receives an alert, the administrator may choose to join a collaborative resolution session.

When a plurality of administrators joins a collaborative resolution session, each administrator is presented with a user interface at his or her console. The user interface may present one or more shared system administration elements, such as system administration portals, and one or more collaboration elements, such as instant messaging elements or the like. Participating administrators may then communicate using the collaboration elements to attempt to resolve an error or other event. Users may share additional system administration elements.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:
    monitor a computer system, wherein the computer system comprises a plurality of computer system components;
    initiate a collaborative session with a plurality of participants responsive to a system administration monitoring system detecting an error in a given computer system component within the plurality of computer system components;
    responsive to the system administration monitoring system detecting the error in the given computer system component, examine a collaboration session history storage and reference past collection session log information from the collaboration history storage and use past collaboration window views to build a custom view for the collaborative session;
    define a default collaboration user interface configuration using the custom view and the past collaboration sessions in the collaboration session history storage and the error in the given computer system component;
    define a first plurality of participants based on past collaboration sessions in the collaboration session history, area of expertise, access control, and the error in the given computer system component; and
    provide at least one shared system administration user interface component to a collaboration user interface in a client device associated with each of the first plurality of participants, wherein the collaboration user interface is presented at each client device according to the default collaboration user interface configuration.

2. The computer program product of claim 1, wherein the computer readable program further causes the computing device to:
    provide a communications component in the collaboration user interface.

3. The computer program product of claim 2, wherein the communications component is a text chat user interface component.

4. The computer program product of claim 1, wherein the computer readable program further causes the computing device to:
    identify at least one administrator associated with the given computer system component, wherein the first plurality of participants comprises the identified at least one administrator.

5. The computer program product of claim 1, wherein the computer readable program further causes the computing device to:
    responsive to a given participant sharing a given user interface component, update the collaboration user interface in a client associated with each of the remaining participants.

6. The computer program product of claim 5, wherein the given participant selects a blocked participant within the plurality of participants and wherein presentation of the given user interface component is disabled in the collaboration user interface at the client associated with the blocked participant.

7. The computer program product of claim 5, wherein the given participant selects a masked area and wherein presentation of the given user interface is masked in an area associated with the masked area in the collaboration user interface.

8. The computer program product of claim 1, wherein the computer readable program further causes the computing device to:
    identify the default collaboration user interface configuration based on a collaboration policy.

9. The computer program product of claim 1, wherein the at least one shared system administration user interface component comprises a system administrator console portlet for the given computer system component.

10. The computer program product of claim 9, wherein the computer readable program further causes the computing device to:
    responsive to a non-participant user requesting access to the system administrator console portlet for the given computer system component, present a selectable control in the system administrator console portlet, wherein the selectable control notifies the non-participant user that the system administrator console portlet is being shared in the collaborative session and prompts the non-participant user to join the collaborative session.

11. The computer program product of claim 1, wherein providing at least one shared system administration user interface component comprises:
    receiving relative coordinates for a selected screen area from a client device associated with a sharing participant;
    providing a shared user interface component that presents a portion of the screen of the client device associated with the sharing participant within an area defined by the relative coordinates to remaining participants within the plurality of participants.

12. An apparatus, comprising:
    a processor; and a memory coupled to the processor, wherein the memory contains instructions which, when executed by the processor, cause the processor to:
    monitor a computer system, wherein the computer system comprises a plurality of computer system components;
    initiate a collaborative session with a plurality of participants responsive to a system administration monitoring system detecting an error in a given computer system component within the plurality of computer system components;
    responsive to the system administration monitoring system detecting the error in the given computer system component, examine a collaboration session history storage and reference past collection session log information from the collaboration history storage and use past collaboration window views to build a custom view for the collaborative session;
    define a default collaboration user interface configuration using the custom view and the past collaboration sessions in the collaboration session history storage and the error in the given computer system component;

define a first plurality of participants based on past collaboration sessions in the collaboration session history, area of expertise, access control, and the error in the given computer system component; and provide at least one shared system administration user interface component to a collaboration user interface in a client device associated with each of the first plurality of participants, wherein the collaboration user interface is presented at each client device according to the default collaboration user interface configuration.

13. The apparatus of claim 12, wherein the instructions further cause the processor to:

identify at least one administrator associated with the given computer system component, wherein the first plurality of participants comprises the identified at least one administrator.

14. A method in a system administration monitoring system for collaborative system management, comprising:

monitoring a computer system, wherein the computer system comprises a plurality of computer system components;

responsive to the system administration monitoring system detecting an error in a given computer system component within the plurality of computer system components in a system administration monitoring data processing system, initiating, by the system administration monitoring system, a collaborative session with a plurality of participants;

responsive to the system administration monitoring system detecting the error in the given computer system component, examining a collaboration session history storage and reference past collection session log information from the collaboration history storage and use past collaboration window views to build a custom view for the collaborative session;

defining, by the system administration monitoring system, a default collaboration user interface configuration using the custom view and the past collaboration sessions in the collaboration session history storage and the error in the given computer system component;

defining a first plurality of participants based on past collaboration sessions in the collaboration session history, area of expertise, access control, and the error in the given computer system component; and providing at least one shared system administration user interface component to a collaboration user interface in a client device associated with each of the first plurality of participants, wherein the collaboration user interface is presented at each client device according to the default collaboration user interface configuration.

15. The method of claim 14, further comprising:
providing a communications component in the collaboration user interface.

16. The method of claim 15, wherein the communications component is a text chat user interface component.

17. The method of claim 14, further comprising:
identifying at least one administrator associated with the given computer system component, wherein the first plurality of participants comprises the identified at least one administrator.

18. The method of claim 14, further comprising:
responsive to a given participant sharing a given user interface component, updating the collaboration user interface in a client device associated with each of the remaining participants.

19. The method of claim 18, wherein the given participant selects a blocked participant within the plurality of participants and wherein presentation of the given user interface component is disabled in the collaboration user interface at the client device associated with the blocked participant.

20. The method of claim 18, wherein the given participant selects a masked area and wherein presentation of the given user interface component is masked in an area associated with the masked area in the collaboration user interface.

21. The method of claim 14, further comprising:
identifying the default collaboration user interface configuration based on a collaboration policy.

22. The method of claim 14, further comprising:
identifying the plurality of participants based on the error in the given computer system component and a collaboration policy.

23. The method of claim 14, wherein the at least one shared system administration user interface component comprises a system administrator console portlet for the given computer system component.

24. The method of claim 23, further comprising:
responsive to a non-participant user requesting access to the system administrator console portlet for the given computer system component, presenting a selectable control in the system administrator console portlet, wherein the selectable control notifies the non-participant user that the system administrator console portlet is being shared in the collaborative session and prompts the non-participant user to join the collaborative session.

25. The method of claim 14, wherein providing at least one shared system administration user interface component comprises:

receiving relative coordinates for a selected screen area from a client device associated with a sharing participant;

providing a shared user interface component that presents a portion of the screen of the client device associated with the sharing participant within an area defined by the relative coordinates to remaining participants within the plurality of participants.

26. A method for providing collaborative system management service, comprising:

providing a collaboration system for a data processing system;

configuring the collaboration system to receive events from a system administration monitoring system, wherein the system administration monitoring system monitors a computer system comprising a plurality of computer system components;

configuring the collaboration system to initiate a collaborative session with a plurality of participants responsive to the system administration monitoring system detecting an error in a given computer system component, examine a collaboration session history storage and reference past collection session log information from the collaboration history storage and use past collaboration window views to build a custom view for the collaborative session, and define a default collaboration user interface configuration using the custom view and the past collaboration sessions in the collaboration session history storage and the error in the given computer system component;

configuring the collaboration system to define a first plurality of participants based on past collaboration sessions in the collaboration session history, area of expertise, access control, and the error in the given computer system component; and configuring the collaboration system to provide at least one shared system administration user interface component to a collaboration user interface in a client device associated with each of the first plurality of participants, wherein the collaboration user interface is presented at each client device according to the default collaboration user interface configuration.

* * * * *